3,749,635
APPARATUS FOR CUTTING OUT AND WELDING A CONTINUOUSLY MOVING SHEATH MADE OF THERMOPLASTIC MATERIAL

Georges Lagain, 3 Rue des Sorbiers, 95 Ermont, France
Filed Sept. 29, 1970, Ser No. 76,445
Claims priority, application France, Oct. 9, 1969, 6934619
Int. Cl B30b 15/34; B32b 31/00
U.S. Cl. 156—515                5 Claims

---

ABSTRACT OF THE DISCLOSURE

The apparatus comprises cutters whose section has a width which varies as a function of their height and which have at least one sharp cutting portion, and which are connected to a heating means, said cutters are mounted on the frame of the machine by means permitting a displacement of the cutters along a plane perpendicular to the surface of the sheath.

The invention may be used in machines for making plastic bags from sheaths.

---

The present invention relates to a method and an apparatus for cutting out and welding a continuously moving sheath made of thermoplastic material.

As is known, machines are used for making plastic bags in which a predetermined length of sheath is moved forwards and is cut and welded on one of its edges to form a bag.

Now, it may be very advantageous to use a single sheath which is then divided to obtain a plurality of sheath elements permitting operation on the same machine with a plurality of sheaths and thus considerably increasing production.

By using from the start a single sheath which is then divided to obtain a plurality of sheaths, a saving may be made on the materials, as it is obvious that one wide sheath is more economical than several separate sheaths.

In the case of printed sheaths, it is therefore possible to work with several sheaths using only one photoelectric cell for controlling the cutting and welding operations. Finally, the use of a wide sheath necessitates only one impression provided for the later cutting out of the sheath elements, whilst the use of separate sheaths requires as many impressions as there are sheaths.

Means are already known for cutting out and welding a continuously advancing sheath, whilst the welding means necessitate an adjustment of the heating temperature according to the speed of movement and the thickness of the sheath.

The method of cutting out and welding according to the present invention enables cutters to be used at constant temperature, by varying the width of the cutter, which is in contact with the sheath, and therefore the welding time.

This method presents an important advantage over the existing welding means, due to the fact that it is much easier to maintain a welding member at constant temperature than to vary the temperature in order to adapt it to different welding conditions.

Moreover, the method according to the invention enables the temperature of the cutter to be instantaneously adapted to the speed of advance of the sheath, whilst in the known methods, it is necessary to wait a certain time before obtaining the suitable welding temperature.

According to the present invention, a plurality of cutters are used, heated to constant temperature, which are engaged with the walls of the sheath along a width of said cutters that may be modified so that the welding time may vary accordingly.

The invention will be described in greater detail with reference to the accompanying drawings, in which.

Figure 1:
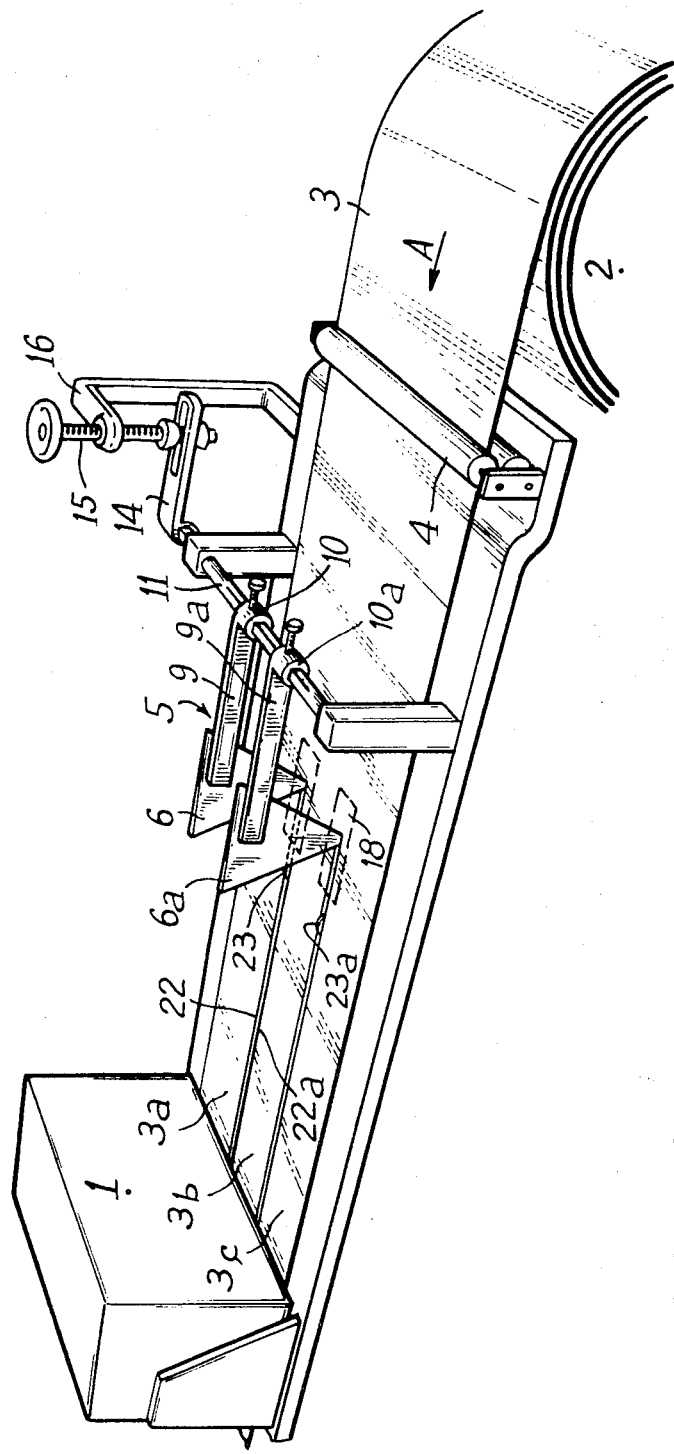
FIG. 1 is a perspective view of the cutting out and welding apparatus according to the invention mounted upstream of a bag-making machine.

Directing attention now to the drawings, FIG. 1 schematically shows a bag-making machine 1 which ensures the cutting out and welding of one of the edges of the different sheaths in order to obtain a bag.

Upstream of the machine 1 is arranged a storage reel 2 from which is continuously unwound, by means of drive rollers 4, a wide sheath 3 made of thermoplastic material moving in the direction of arrow A towards the cutting out and welding apparatus 5 for dividing the sheath 3 into three sheath elements 3a, 3b, 3c.

The sheath elements 3a, 3b, 3c, whose edges are cut and welded on passing through the apparatus 5, are directed towards the machine 1 which proceeds with the simultaneous cutting and welding of three corresponding bags during each operation.

Figure 2:
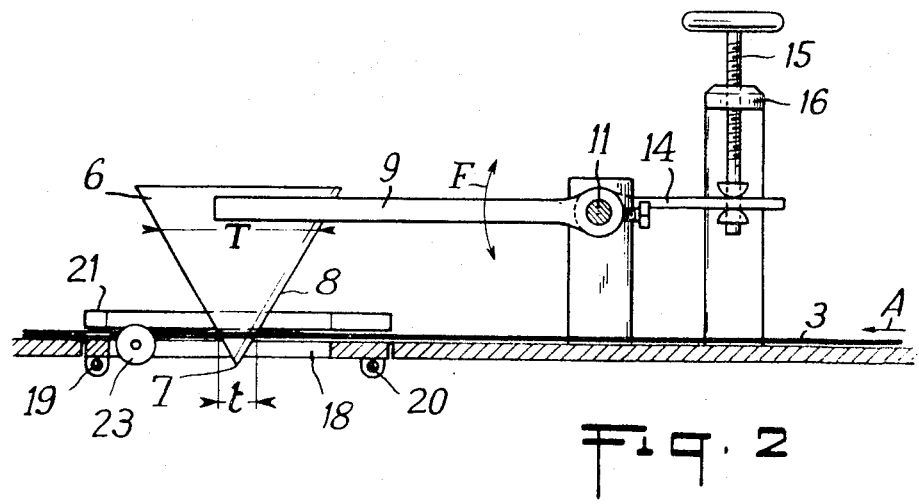
FIG. 2 is an elevational view of an embodiment of the cutting out and welding apparatus according to the invention.
Figure 3:
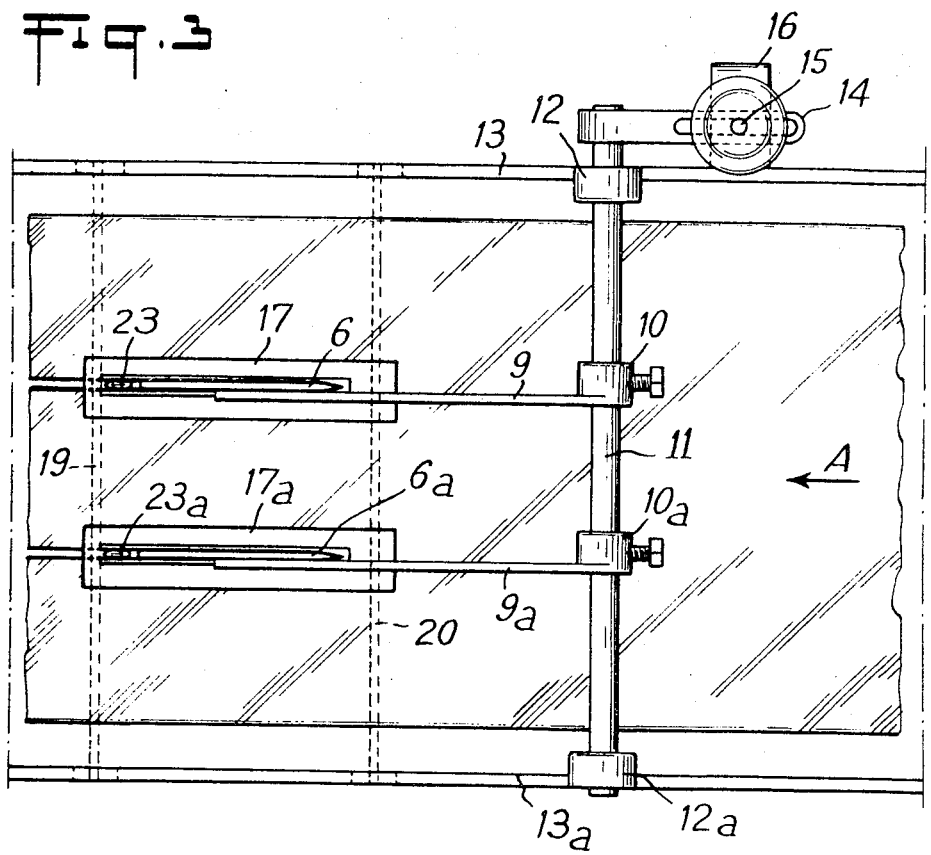
FIG. 3 is a plan view of the same apparatus as shown in FIG. 2.

The cutting out and welding apparatus 5, shown in detail in FIGS. 2 and 3, comprises, in the embodiment shown, two cutters such as 6 but it is obvious that it could comprise a different number of cutters according to the number of sheath elements that it is desired to obtain.

These cutters 6 are constituted by a blade of triangular section, the apex 7 of which is directed towards the sheath 3 in which it is engaged, along a width $t$. In section, the blade constituting the cutters 6 (FIG. 3) has at one of its ends a sharp portion which constitutes the cutting edge 8 which cuts the sheath 3.

The cutter blades may be heated by means of a mean frequency current or by incorporated electrical resistors.

Each of the cutters 6, 6a is fixed by one of its sides to an arm 9, 9a, mounted by means of a clamping collar 10, 10a, on a rod 11 mounted to pivot at its two ends by means of bearings 12, 12a on the sides 13, 13a of a frame.

At one of the ends, or at the two ends of the pivoting rod 11, there is fixed a lever 14 in which is rotatably and fixedly mounted a screw 15 which is engaged in a tapped portion of a boss 16 unitary with the side 13 of the frame. In this manner, the angular position (arrow F) of the arm 9 may be adjusted by screwing or unscrewing the screw 15 in the boss 16 and the position in height of the cutters 6 with respect to the surface of the sheath 3 may be modified.

For guiding the sheath 3 and ensuring its abutment during the cutting and welding operation, there are provided beneath each cutter 6 plates such as 17 provided with a slot 18 in which the cutter 6 may move for its engagement over a more or less large width $t$ with the sheath 3.

The plates 17, 17a are mounted to slide transversely on two parallel guide rods 19, 20 fixed at their ends to the sides 13, 13a of the frame.

This arrangement is intended to ensure the displacement of the plates 17, 17a, in correlation with the cutters 6, 6a, whose position is adjustable by means of the collars 10, 10a, of the arms 9, 9a, in order to enable the width of the sheath elements which is desired to be obtained, to be modified.

It is also possible to provide corresponding plates 21 shown in broken lines, which are arranged above the sheath 2.

The device according to the invention operates as follows:

When the bag-making machine 1 is set into operation, the sheath 3 being driven in the direction of arrow A by the rollers of said sheath and by rollers 4, the cutters 6 which are previously heated to constant temperature by a known electrical means, in particular by mean frequency current, are lowered in order to engage in the sheath 3 along a certain width $t$ which corresponds to a contact time $t_1$ with the walls of the sheath 3 The sheath 3 which is cut by the cutting edge 8 of the cutters is then subjected to heating for a period of time $t_1$, so that the edges 22, 22a of the sheath elements 3a, 3b are welded and said elements are closed.

As the welding time $t_1$ varies as a function of the speed of advance movement of the sheath and the thickness of the sheath, it is sufficient, according to the invention, to vary the width $t$ of the cutters which is in contact with the sheath, by reason of the temperature of the cutters, which is constant.

This variation of the width of contact of the cutters 6 with the sheath is obtained by pivoting the arms 9 in the direction of arrow F and the rod 11 in its bearings 12, 12a by means of the screw 15. The width of contact of the cutters may vary from apex 7 to width T.

It is also possible to servo-control the displacement of the cutters in height at the speed of advance of the sheath by a known servo-control means influenced by the speed of advance of the sheath and acting on the lever 14.

In this way, it is possible to modify the speed of the sheath during operation and to obtain a satisfactory welding adapted to this speed.

Upon leaving the cutting out apparatus, the sheath elements 3a, 3b, 3c are kept separate from one another by guide members 23, 23a.

What is claimed is:

1. Apparatus for slitting a flattened longitudinal sheath of thermoplastic material and for welding slit edges together to form separate longitudinal sheaths of narrower width comprising means for moving the flattened sheath in the direction of its length, at least one blade element mounted above the sheath, said at least one blade element extending longitudinally of the sheath and substantially vertically to the plane of the sheath and having a leading cutting edge and a trailing edge, the distance between the cutting edge and the trailing edge, in a plane parallel to the plane of the sheath, varying from the bottom to the top of said blade element, means for raising and lowering said at least one blade element with respect to the sheath so that the bottom of said blade element may be inserted into the moving sheath longitudinally for slitting said sheath by the cutting edge, means for heating said blade element to a temperature sufficient to weld the juxtaposed slit edges during the time the slit edges pass along and are in contact with said blade element before clearing the trailing edge thereof to weld the edges together to form separate sheaths, said means for raising and lowering said blade element serving to vary the time the slit edges of the sheath are exposed to the heated blade element.

2. Apparatus as claimed in claim 1 wherein said at least one blade element comprises a plurality of blade elements mounted in spaced relation to each other transversely of the sheath whereby at least three separate longitudinal sheaths of narrower width are formed and further comprising means for adjusting the distance between each of said blade elements.

3. Apparatus as claimed in claim 1 wherein each of said at least one blade elements is triangular in shape, the apex being lowermost and the base uppermost.

4. Apparatus as claimed in claim 1 wherein the means for raising and lowering each of said blade elements comprising a shaft mounted for rotation above and transversely of the sheath, a support arm for each blade element, one end of said arm being fixed to its associated blade element, the other end being non-rotatably mounted on said shaft, means for slidably adjusting the position of each arm and affixed blade element along said shaft and means for rotating said shaft so as to vary the position of said blade element with respect to the sheath.

5. Apparatus as claimed in claim 1 and further comprising at least one support plate provided with a slot therein, said support plate being adjustably mounted beneath the sheath so that said blade element, when positioned for slitting and welding the sheath, will enter the slot while the sheath is supported by said plate.

References Cited
UNITED STATES PATENTS

| | | | |
|---|---|---|---|
| 2,781,079 | 2/1957 | Ruby et al. | 156—515 |
| 2,805,700 | 9/1957 | Klasing et al. | 156—515 |
| 3,493,456 | 2/1970 | Viluns | 156—530 |
| 3,320,111 | 5/1967 | Lucia et al. | 156—515 |
| 2,711,779 | 6/1955 | Carland | 156—515 X |
| 2,990,875 | 7/1961 | Samuels et al. | 156—515 X |
| 3,368,930 | 2/1968 | Beason | 156—515 X |

WILLIAM J. VAN BALEN, Primary Examiner

U.S. Cl. X.R.

156—251